United States Patent
Dong

(10) Patent No.: US 12,003,329 B2
(45) Date of Patent: Jun. 4, 2024

(54) METHOD FOR TRANSMITTING HYBRID AUTOMATIC REPEAT REQUEST FEEDBACK, AND COMMUNICATION DEVICE

(71) Applicant: BEIJING XIAOMI MOBILE SOFTWARE CO., LTD., Beijing (CN)

(72) Inventor: Xiandong Dong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 71 days.

(21) Appl. No.: 17/775,558

(22) PCT Filed: Nov. 11, 2019

(86) PCT No.: PCT/CN2019/117226
§ 371 (c)(1),
(2) Date: May 9, 2022

(87) PCT Pub. No.: WO2021/092729
PCT Pub. Date: May 20, 2021

(65) Prior Publication Data
US 2022/0399961 A1    Dec. 15, 2022

(51) Int. Cl.
*H04L 1/1812* (2023.01)
*H04L 1/1607* (2023.01)

(52) U.S. Cl.
CPC .......... *H04L 1/1812* (2013.01); *H04L 1/1621* (2013.01); *H04L 1/1642* (2013.01)

(58) Field of Classification Search
None
See application file for complete search history.

(56) References Cited

U.S. PATENT DOCUMENTS

| | | |
|---|---|---|
| 8,108,746 B2 | 1/2012 | Sawahashi et al. |
| 2010/0118986 A1 | 5/2010 | Hong et al. |
| 2016/0080115 A1* | 3/2016 | Josiam .................. H04L 5/0055 370/329 |
| 2018/0138959 A1* | 5/2018 | Chun ....................... H04B 7/06 |
| 2018/0375969 A1 | 12/2018 | Tranin et al. |
| 2020/0296624 A1* | 9/2020 | Liu ......................... H04W 40/20 |
| 2020/0344007 A1* | 10/2020 | Chen ...................... H04L 1/1819 |

FOREIGN PATENT DOCUMENTS

| | | |
|---|---|---|
| CN | 1734998 A | 2/2006 |
| CN | 105790896 A | 7/2016 |

OTHER PUBLICATIONS

Indian Patent Application No. 202247032879, Office Action dated Oct. 17, 2022, 7 pages.
European Patent Application No. 19952561.9, Search and Opinion dated Jun. 29, 2023, 8 pages.
PCT/CN2019/117226 English translation of International Search Report dated Aug. 12, 2020, 2 pages.

* cited by examiner

*Primary Examiner* — Jason E Mattis
*Assistant Examiner* — Bao G Nguyen
(74) *Attorney, Agent, or Firm* — COZEN O'CONNOR

(57) ABSTRACT

A method for transmitting a hybrid automatic repeat request feedback, and a communication device are provided. The method includes: generating a reception feedback frame including a reception feedback of a block in a data frame based on a reception status of the block of the data frame transmitted in blocks; and sending the reception feedback frame.

20 Claims, 6 Drawing Sheets

| A-MSDU sub-frame 1 | A-MSDU sub-frame 2 | ... | A-MSDU sub-frame n |
|---|---|---|---|

METHOD FOR TRANSMITTING HYBRID AUTOMATIC REPEAT REQUEST FEEDBACK, AND COMMUNICATION DEVICE

CROSS-REFERENCE TO RELATED APPLICATION

This application is a U.S. national phase of International Application No. PCT/CN2019/117226, filed with the State Intellectual Property Office of P. R. China on Nov. 11, 2019.

TECHNICAL FIELD

The disclosure relates to, but is not limited to a field of wireless communication technologies, and particularly to a method for transmitting a hybrid automatic repeat request (HARQ) feedback, a communication device and a storage medium.

BACKGROUND

A study group (SG) has been founded by the Institute of Electrical and Electronics Engineers (IEEE) to study a next generation mainstream Wi-Fi technology. A scope of the study includes Wi-Fi transmission of 320 MHz bandwidth, aggregation and collaboration technologies using multiple frequency bands and so on. A proposed vision is to improve the rate and throughput by at least four times compared to the existing standard IEEE802.11 ax. The main application scenario of the new technology includes video transmission, augmented reality (AR), virtual reality (VR) and so on.

SUMMARY

According to a first aspect of the embodiments of the disclosure, a method for transmitting a hybrid automatic repeat request (HARQ) feedback is provided. The method is applied in a first communication end and includes: generating a reception feedback frame including a reception feedback of a block in a data frame based on a reception status of the block of the data frame transmitted in blocks; and sending the reception feedback frame.

According to a second aspect of the embodiments of the disclosure, a method for transmitting a hybrid automatic repeat request (HARQ) feedback is provided. The method is applied in a second communication end and includes: receiving a reception feedback frame sent by a first communication end; and determining a reception status of a block based on a reception feedback of the block in a data frame included in the reception feedback frame, in which the data frame is transmitted in blocks.

According to a third aspect of the embodiments of the disclosure, a communication device is provided. The device includes: a processor and a memory storing an executable program executed by the processor. When the processor executes the executable program, the processor performs steps of the method for transmitting a hybrid automatic repeat request (HARQ) feedback according to the first aspect or the second aspect.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

DETAILED DESCRIPTION

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

In a related Wi-Fi technology, acknowledge (ACK) or block acknowledge (BA) are used to represent reception statuses of a media access control service data unit (MSDU) and an aggregation media access control service data unit (A-MSDU), respectively.

Accordingly, embodiments of the disclosure provide a method and apparatus for transmitting a hybrid automatic repeat request (HARD) feedback, a communication device and a storage medium.

An execution subject involved in the embodiments of the disclosure includes but is not limited to a network device in a wireless communication network, especially a Wi-Fi network, such as a network device in IEEE802.11a/b/g/n/ac standard and a network device in IEEE802.11be standard of a next generation Wi-Fi network. The network device includes but is not limited to a wireless access point (AP) device such as a Wi-Fi router, a wireless station (STA), a user terminal, a user node, a mobile terminal, a tablet personal computer or the like.

Figure 1:
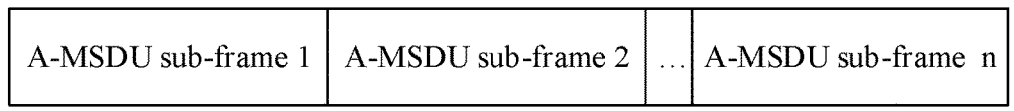
FIG. 1 is a schematic diagram illustrating a frame structure of an aggregation media access control service data unit (A-MSDU) according to an embodiment.
Figure 2:
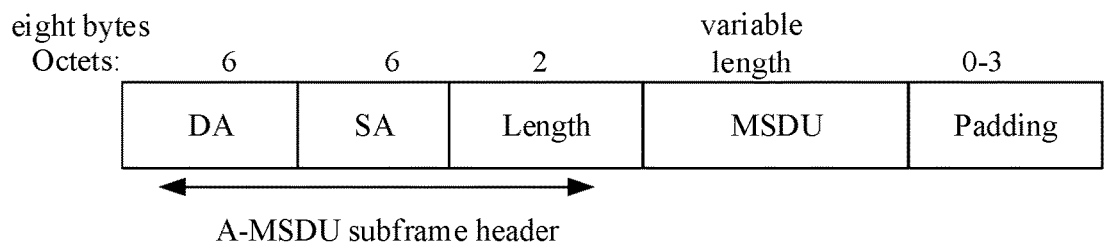
FIG. 2 is a schematic diagram illustrating a frame structure of a basic A-MSDU sub-frame according to an embodiment.
Figure 3:
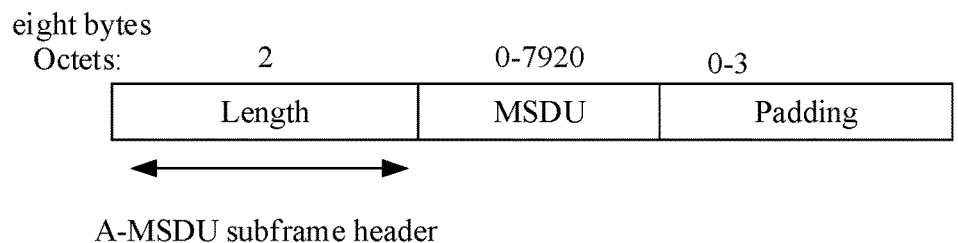
FIG. 3 is a schematic diagram illustrating a frame structure of a short A-MSDU sub-frame according to an embodiment.

In an application scenario of the embodiments of the disclosure, in order to support higher data throughput, reduce a transmission latency, and improve an effective usage rate of frequency spectrum, IEEE802.11be has two formats of data frames: MSDU and A-MSDU. A frame structure of the A-MSDU is shown in FIG. 1. One A-MSDU includes a plurality of A-MSDU sub-frames. The A-MSDU sub-frame may include two frame structures: a basic A-MSDU sub-frame illustrated in FIG. 2 and a short A-MSDU sub-frame illustrated in FIG. 3. The basic A-MSDU sub-frame may include information such as a source address and a destination address of an A-MSDU sub-frame. The short A-MSDU sub-frame does not include the information such as the source address and the destination address of the A-MSDU sub-frame.

Figure 4:
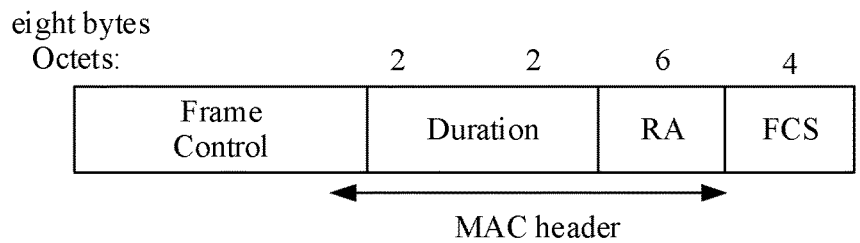
FIG. 4 is a schematic diagram illustrating a frame structure of an acknowledge (ACK) frame according to an embodiment.

For a unicast MSDU or A-MSDU, an ACK frame illustrated in FIG. 4 is usually used to feedback a reception status. If a duration subfield of the ACK frame is set to 0, it indicates that the unicast data frame is completely received. If the duration subfield of the ACK frame is set to 1, it indicates that the unicast data frame is not successfully received.

Figure 5:
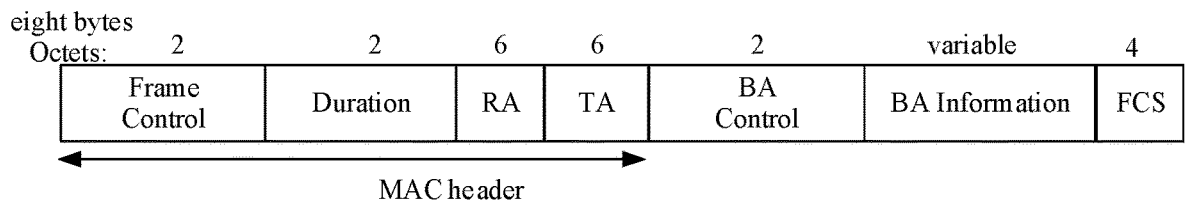
FIG. 5 is a schematic diagram illustrating a frame structure of a block acknowledge (BA) frame according to an embodiment.
Figure 6:
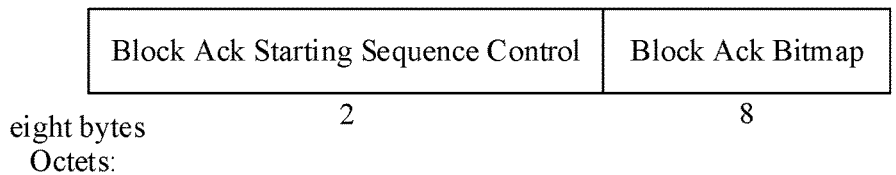
FIG. 6 is a schematic diagram illustrating a frame structure of a compressed block ACK frame according to an embodiment.
Figure 7:
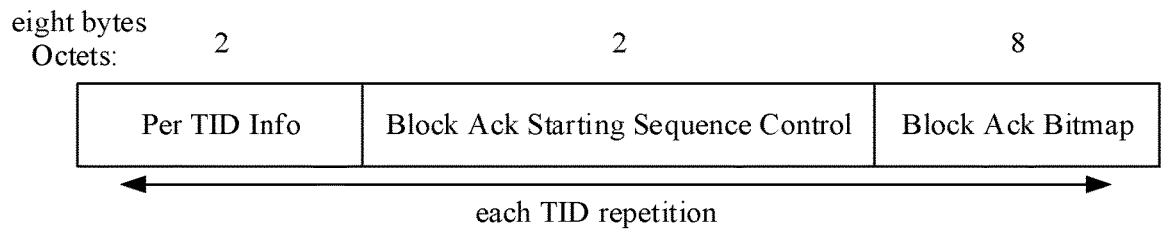
FIG. 7 is a schematic diagram illustrating a frame structure of a multi-traffic identifier block ACK frame according to an embodiment.

A BA frame may be configured to feedback reception statuses of multiple consecutive MSDUs or A-MSDUs. A frame structure of the BA frame is illustrated in FIG. 5. BA information filed may include a compressed block ACK illustrated in FIG. 6 or a multi-TID block ACK illustrated in FIG. 7. In the compressed block ACK or the multi-TID block ACK, a block ACK bitmap includes 64 bits, and each bit indicates a reception status of one MSDU or A-MSDU. "1" indicates that the data frame is successfully received.

Figure 8:
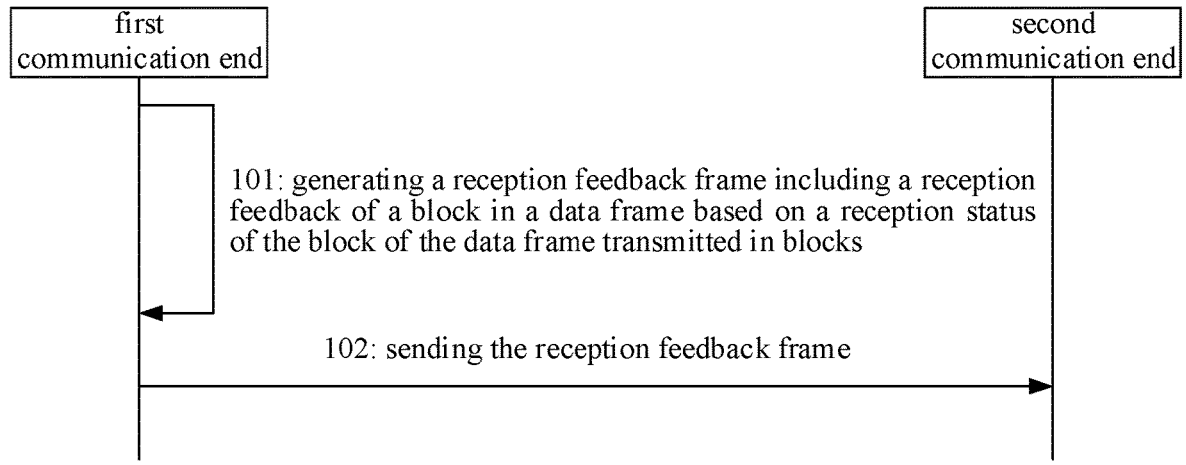
FIG. 8 is a flowchart illustrating a method for transmitting a hybrid automatic repeat request (HARQ) feedback according to an embodiment.

As illustrated in FIG. 8, the embodiment of the disclosure provides a method for transmitting a HARQ feedback. The method may be applied in a first communication end. The method may include the following.

At block 101, a reception feedback frame including a reception feedback of a block in a data frame is generated based on a reception status of the block of the data frame transmitted in blocks.

At block 102, the reception feedback frame is sent.

Here, a wireless communication may be a Wi-Fi communication using a standard such as IEEE802.11be. The first communication end and a second communication end may be the STA or AP in the Wi-Fi communication. The first communication end may be a receiving end of the data frame, i.e., a sending end of the reception feedback frame. The second communication end may be a sending end of the data frame, i.e., a receiving end of the reception feedback frame.

The data frame may be a data frame transmitted using the Wi-Fi communication technology. The data frame may be MSDU, A-MSDU, A-MSDU sub-frame and the like.

In the IEEE802.11be, the HARQ may be used to perform feedback. If the ACK or BA in the related art is used to feedback the reception status of the data frame, the MSDU or A-MSDU not successfully received needs to be cached. On one hand, the receiving end of the data frame needs to cache the MSDU or A-MSDU not successfully received. On the other hand, the sending end of the data frame needs to retransmit the MSDU or A-MSDU not successfully received. Since a data amount of the MSDU or A-MSDU is huge, the storage and retransmission of the MSDU or A-MSDU not successfully received may consume a large of system storage resources and transmission frequency band resources.

Figure 9:
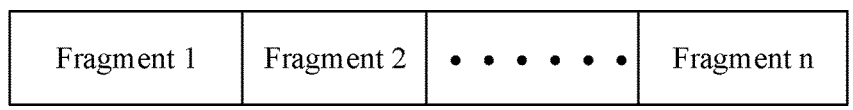
FIG. 9 is a schematic diagram illustrating a structure of a block of a MAC service data unit according to an embodiment.

The data frame may be sent in blocks. In detail, as illustrated in FIG. 9, one MSDU may be divided into multiple blocks (also called as fragments). The sending end of the data frame may send respective blocks according to an order of dividing numbers of the respective blocks, to complete transmission of the MSDU. As illustrated in FIG. 1, one A-MSDU may include multiple A-MSDU sub-frames. The sending end of the data frame may send respective A-MSDU sub-frames according to an order of sub-frame numbers of the respective sub-frames, to complete transmission of the A-MSDU. One A-MSDU sub-frame may be one block of the A-MSDU. One A-MSDU sub-frame may also be divided into multiple blocks. The sending end of the data frame may send the respective blocks according to an order of dividing numbers of the respective blocks, to complete transmission of the A-MSDU.

The reception feedback may be an ACK frame or NACK configured to feedback the reception status of the data frame, or may be a block ACK information configured to feedback the reception statuses of consecutive data frames.

The reception feedbacks of respective blocks may use a bitmap to indicate reception statuses of respective blocks. One or more bits in the bitmap may be used to represent the reception status of each block. For example, "1" may indicate that the block is successfully received, while "0" indicates that the block is not successfully received. Or, "0" may indicate that the block is successfully received, while "1" indicates that the block is not successfully received.

The first communication end sends the reception feedback frame to the second communication end based on the reception status of each block in the data frame, stores the block not successfully received in a cache and performs a combined decoding by combining the block retransmitted by the second communication end. The reception feedback of each block is carried in the reception feedback frame. A frame structure of the reception feedback frame may be illustrated in FIG. 10. The reception feedbacks of respective blocks may be represented by the bitmap.

After receiving the reception feedback frame, the second communication end determines the block not successfully received based on the reception feedback of each block in the data frame and retransmits the block not successfully received.

For example, the reception feedbacks of respective blocks in the reception feedback frame may use a bitmap to indicate the reception status of each block respectively. "1" may indicate that the block is successfully received, while "0" may indicate that the block is not successfully received. The second communication end retransmits the block corresponding to "0" in the bitmap after receiving the reception feedback frame.

In this way, feedback is made to each block of the data frame. On one hand, the receiving end of the data frame may only cache the block not successfully received instead of the whole data frame, thus reducing cache occupation and saving cache resources. On the other hand, the sending end of the data frame may retransmit the block not successfully received rather than the whole data frame based on the reception feedback of each block, thus reducing data amount of retransmission and further reducing occupation of transmission frequency band resources and improving usage rate of the transmission frequency band resources.

In an embodiment, block 101 may include at least one of the following: in response to the data frame being a media access control (MAC) service data unit of a first type, generating the reception feedback frame including a reception feedback of a first-class data block based on a reception status of at least one first-class data block of the MAC service data unit of the first type; in response to the data frame being a MAC service data unit of a second type, generating the reception feedback frame including a reception feedback of a sub-frame based on a reception status of at least one sub-frame of the MAC service data unit of the second type; and in response to the data frame being the MAC service data unit of the second type, generating the reception feedback frame including a reception feedback of a second-class data block based on a reception status of at least one second-class data block in at least one sub-frame of the MAC service data unit of the second type.

Here, the MAC service data unit of the first type may be an MSDU, and the first-class data block may be a data block divided from the MSDU when the MSDU is transmitted in blocks. The first communication end sends the reception feedback frame to the second communication end based on the reception status of each block of the MSDU, stores the block not successfully received of the MSDU in the cache for subsequent combined decoding by combining the data block retransmitted by the sending end of the data frame. The reception feedback frame carries the reception feedback of each block of the MSDU. The frame structure of the reception feedback frame may be illustrated in FIG. 10. The reception feedbacks of respective blocks may be represented by a bitmap.

After receiving the reception feedback frame sent by the first communication end, the second communication end determines the block not successfully received of the MSDU based on the reception feedback of each block of the MSDU, and retransmits the block not successfully received of the MSDU.

Here, the MAC service data unit of the second type may be an A-MSDU, and the block of the data frame may be an A-MSDU sub-frame of the A-MSDU. The first communication end sends the reception feedback frame to the second communication end based on the reception status of each A-MSDU sub-frame of the A-MSDU. The first communication end may store the A-MSDU sub-frame not successfully received in the cache for subsequent combined decoding by combining the A-MSDU sub-frame retransmitted by the sending end of the data frame. The reception feedback frame carries the reception feedback of each A-MSDU sub-frame. The frame structure of the reception feedback frame may be illustrated in FIG. 10. The reception feedbacks of respective A-MSDU sub-frames may be represented by a bitmap.

After receiving the reception feedback frame sent by the first communication end, the second communication end determines the A-MSDU sub-frame not successfully received based on the reception feedback of each A-MSDU sub-frame of the A-MSDU, and retransmits the A-MSDU sub-frame not successfully received.

An A-MSDU sub-frame may also be divided into multiple data blocks. The sending end of the data frame may send respective data blocks in sequence, to complete transmission of the A-MSDU sub-frame. The second-class data block may be a data block of the A-MSDU sub-frame. The first communication end sends the reception feedback frame to the second communication end based on the reception status of each data block of the A-MSDU sub-frame. The first communication end may store the data block not successfully received of the A-MSDU sub-frame in the cache for subsequent combined decoding by combining the data block retransmitted by the sending end of the data frame. The reception feedback frame carries the reception feedback of each data block of each A-MSDU sub-frame. The frame structure of the reception feedback frame may be illustrated in FIG. 11. The reception feedbacks of respective data blocks of respective A-MSDU sub-frames may be represented by a bitmap.

After receiving the reception feedback frame sent by the first communication end, the second communication end determines the data block of the A-MSDU sub-frame not successfully received based on the reception feedback of each data block of each A-MSDU sub-frame, and retransmits the data block of the A-MSDU sub-frame not successfully received.

In an embodiment, the first-class data block is obtained by dividing the MAC service data unit of the first type based on a first predetermined block length.

The second-class data block is obtained by dividing the sub-frame of the MAC service data unit of the second type based on a second predetermined block length.

The MAC service data unit of the first type may be the MSDU, and the MAC service data unit of the second type may be the A-MSDU.

For example, the first predetermined block length, i.e., a block threshold (also called as fragment threshold) may be set in advance, for example 300 bytes. When sending the MSDU, one MSDU may be divided into multiple blocks in the unit of 300 bytes, and sent in blocks.

Each block of 300 bytes may be considered as one first-class data block.

The second predetermined block length, i.e., a block threshold (also called as fragment threshold) may be set in advance, for example 300 bytes. When sending the A-MSDU, one A-MSDU may be divided into multiple blocks in the unit of 300 bytes, and sent in blocks. Each block of 300 bytes may be considered as one second-class data block.

In an embodiment, the reception feedback frame including the reception feedback of the second-class data block further includes a first identification.

The first identification is configured to indicate a sub-frame number of a sub-frame including the second-class data block. The first identification is configured to indicate a sub-frame number of a sub-frame of the aggregation MAC service data unit.

Figure 11:
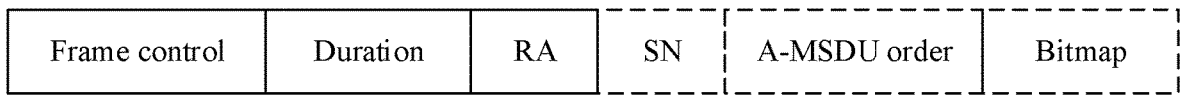
FIG. 11 is a schematic diagram illustrating a frame structure of a reception feedback frame according to another embodiment.

As illustrated in FIG. 11, when the data frame is an A-MSDU sub-frame, the first communication end may carry the first identification in the reception feedback frame to indicate the A-MSDU sub-frame to which the reception feedback of the block of the A-MSDU sub-frame included in the reception feedback frame belongs. The first identification may be a sub-frame number of the A-MSDU sub-frame. One A-MSDU sub-frame has one unique sub-frame number in one A-MSDU. In the reception feedback frame, the first identification may be disposed in front of the corresponding reception feedback of the block of the A-MSDU sub-frame.

The second communication end may determine the A-MSDU sub-frame to which the reception feedback of the block of the A-MSDU sub-frame belongs based on the first identification included in the reception feedback frame, and retransmit the block not successfully received of the A-MSDU frame based on the reception feedback of the block of the A-MSDU sub-frame.

By carrying the sub-frame number of the A-MSDU sub-frame in the reception feedback frame, the A-MSDU sub-frame to which the reception feedback of the block of the A-MSDU sub-frame belongs may be determined accurately, thus improving accuracy of feedback.

In an embodiment, the reception feedback frame further includes a second identification.

The second identification is configured to indicate a sequence number of the data frame.

Figure 10:
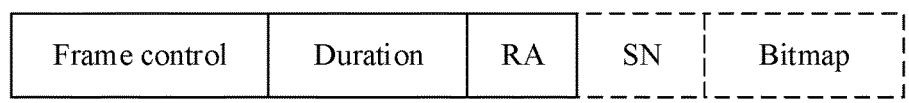
FIG. 10 is a schematic diagram illustrating a frame structure of a reception feedback frame according to an embodiment.

As illustrated in FIG. 10, when the data frame is an MSDU, the second identification may be configured to indicate a sequence number (SN) of the MSDU.

The first communication end may carry the SN of the MSDU in the reception feedback frame to indicate the MSDU to which the reception feedbacks of respective blocks of the MSDU included in the reception feedback frame belong. In one transmission, one MSDU has one unique SN. In the reception feedback frame, the SN may be disposed in front of the corresponding reception feedbacks of respective blocks of the MSDU.

The second communication end may determine the MSDU to which the reception feedbacks of respective blocks of the MSDU belong based on the SN included in the reception feedback frame, and retransmit the block not successfully received of the MSDU based on the reception feedbacks of respective blocks of the MSDU.

As illustrated in FIG. 10, when the data frame is an A-MSDU, the second identification may be configured to indicate a sequence number (SN) of the A-MSDU.

The first communication end may carry the SN of the A-MSDU in the reception feedback frame to indicate the A-MSDU to which the reception feedbacks of respective A-MSDU sub-frames of the A-MSDU included in the reception feedback frame belong. In one transmission, one A-MSDU has one unique SN. In the reception feedback frame, the SN may be disposed in front of the corresponding reception feedbacks of respective A-MSDU sub-frames of the A-MSDU.

The second communication end may determine the A-MSDU to which the reception feedbacks of respective A-MSDU sub-frames of the A-MSDU belong based on the SN included in the reception feedback frame, and retransmit the A-MSDU sub-frame not successfully received of the A-MSDU based on the reception feedbacks of respective A-MSDU sub-frames of the A-MSDU.

As illustrated in FIG. 11, when the reception feedback frame is configured to feedback the reception feedback of the A-MSDU sub-frame, the second identification may be configured to indicate the SN of the A-MSDU to which the A-MSDU sub-frame belongs.

As illustrated in FIG. 11, when the data frame is an A-MSDU sub-frame, the first communication end may carry the sub-frame number of the A-MSDU sub-frame and the SN of the A-MSDU to which the A-MSDU sub-frame belongs in the reception feedback frame, to indicate the A-MSDU sub-frame to which the reception feedback of the block of the A-MSDU sub-frame included in the reception feedback frame belongs and the A-MSDU to which the A-MSDU sub-frame belongs. One A-MSDU sub-frame has one unique sub-frame number in one A-MSDU. In one transmission, one A-MSDU has one unique SN. In the reception feedback frame, the SN of the A-MSDU and the sub-frame number of the A-MSDU may be disposed in front of the corresponding reception feedback of the block of the A-MSDU sub-frame.

The second communication end may determine the A-MSDU sub-frame to which the reception feedback of the block of the A-MSDU sub-frame belongs and the A-MSDU to which the A-MSDU sub-frame belongs based on the SN of the A-MSDU and the sub-frame number of the A-MSDU sub-frame included in the reception feedback frame, and retransmit the determined block not successfully received of the A-MSDU sub-frame in the A-MSDU based on the reception feedback of the block of the A-MSDU sub-frame.

For example, when only one data frame is transmitted between the second communication end and the first communication end, the second identification can be omitted.

By carrying the SN of the data frame in the reception feedback frame, the data frame to which the reception feedback of the block belongs can be determined accurately, thus improving accuracy of feedback.

In an embodiment, the reception feedback frame further includes a third identification.

The third identification is configured to indicate a traffic identifier (TID) of the data frame.

Figure 12:
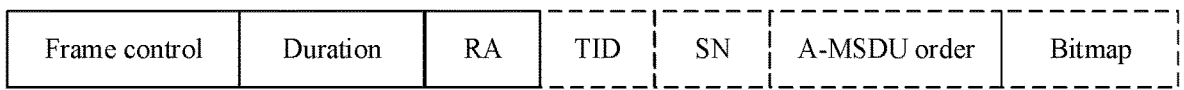
FIG. 12 is a schematic diagram illustrating a frame structure of a reception feedback frame according to a further embodiment.

As illustrated in FIG. 12, different TIDs may be carried in different reception feedback frames. The TID may be configured to indicate a priority of the reception feedback frame. The reception feedback frames have the same priority may carry the same TID.

In an embodiment, block 101 may further include in response to the reception feedback frame being configured to feedback reception feedbacks of a block in a predetermined number of data frames, generating the reception feedback frame including the reception feedback of the block in each data frame.

The first communication end and the second communication end may negotiate the number of the data frames feedback by the reception feedback frame before sending the data frame. The feedback information of each data frame may occupy one predetermined space of the reception feedback frame. The predetermined space may be a separate field in the reception feedback frame. A length of the predetermined space may vary with a length of the reception feedback of the data frame. In the reception feedback frame, the feedback information of respective data frames is ordered based on a reception sequence of the respective data frames. The feedback information of the data frame may include reception feedbacks of respective blocks in the data frame, the SN of the data frame, the TID of the data frame and so on. When the data frame is an A-MSDU sub-frame, the feedback information of the data frame may further include the sub-frame number of the A-MSDU sub-frame.

The locations and arrangements of the first identification, and/or the second identification, and/or the third identification of the data frame and/or the reception feedbacks of respective blocks of the data frame in the reception feedback frame are not limited here, which may be set according to actual requirements.

Figure 13:
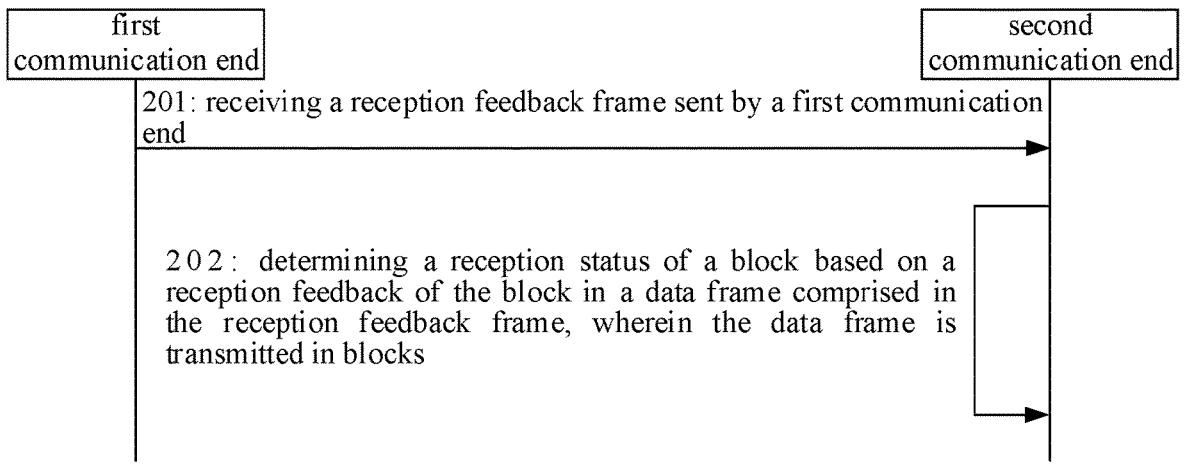
FIG. 13 is a flowchart illustrating a method for transmitting a HARQ feedback according to another embodiment.

As illustrated in FIG. 13, the embodiment of the present disclosure provides a method for transmitting a HARQ feedback. The method may be applied in a second communication end. The method may include the following.

At block 201, a reception feedback frame sent by a first communication end is received.

At block 202, a reception status of a block is determined based on a reception feedback of the block in a data frame included in the reception feedback frame, in which the data frame is transmitted in blocks.

Here, a wireless communication may be a Wi-Fi communication using a standard such as IEEE802.11be. The first communication end and the second communication end may be the STA or AP in the Wi-Fi communication. The first communication end may be a receiving end of the data frame, i.e., a sending end of the reception feedback frame. The second communication end may be a sending end of the data frame, i.e., a receiving end of the reception feedback frame.

The data frame may be a data frame transmitted using the Wi-Fi communication technology. The data frame may be MSDU, A-MSDU, A-MSDU sub-frame and the like.

The data frame may be sent in blocks. In detail, as illustrated in FIG. 9, one MSDU may be divided into multiple blocks (also called as fragments). The sending end of the data frame may send respective blocks according to an order of dividing numbers of the respective blocks, to complete transmission of the MSDU. As illustrated in FIG. 1, one A-MSDU may include multiple A-MSDU sub-frames. The sending end of the data frame may send respective A-MSDU sub-frames according to an order of sub-frame numbers of the respective sub-frames, to complete transmission of the A-MSDU. One A-MSDU sub-frame may be one block of the A-MSDU. One A-MSDU sub-frame may also be divided into multiple blocks. The sending end of the data frame may send the respective blocks according to an order of dividing numbers of the respective blocks, to complete transmission of the A-MSDU.

The reception feedback may be an ACK frame or NACK configured to feedback the reception status of the data frame, or may be a block ACK information configured to feedback the reception statuses of consecutive data frames.

The reception feedbacks of respective blocks may use a bitmap to indicate reception statuses of respective blocks. One or more bits in the bitmap may be used to represent the reception status of each block. For example, "1" may indicate that the block is successfully received, while "0" indicates that the block is not successfully received. Or, "0" may indicate that the block is successfully received, while "1" indicates that the block is not successfully received.

The first communication end sends the reception feedback frame to the second communication end based on the reception status of each block in the data frame, stores the block not successfully received in a cache and performs a combined decoding by combining the block retransmitted by the second communication end. The reception feedback of each block is carried in the reception feedback frame. A frame structure of the reception feedback frame may be illustrated in FIG. 10. The reception feedbacks of respective blocks may be represented by the bitmap.

After receiving the reception feedback frame, the second communication end determines the block not successfully received based on the reception feedback of each block in the data frame and retransmits the block not successfully received.

For example, the reception feedbacks of respective blocks in the reception feedback frame may use a bitmap to indicate the reception status of each block respectively. "1" may indicate that the block is successfully received, while "0" may indicate that the block is not successfully received. The second communication end retransmits the block corresponding to "0" in the bitmap after receiving the reception feedback frame.

In this way, feedback is made to each block of the data frame. On one hand, the receiving end of the data frame may only cache the block not successfully received instead of the whole data frame, thus reducing cache occupation and saving cache resources. On the other hand, the sending end of the data frame may retransmit the block not successfully received instead of the whole data frame based on the reception feedback of each block, thus reducing data amount of retransmission and further reducing occupation of transmission frequency band resources and improving usage rate of the transmission frequency band resources.

In an embodiment, block 101 may include at least one of the following: determining a reception status of at least one first-class data block of a media access control (MAC) service data unit of a first type based on a reception feedback of the at least one first-class data block of the MAC service data unit of the first type included in the reception feedback frame; determining a reception status of at least one sub-frame of a MAC service data unit of a second type based on a reception feedback of the at least one sub-frame of the MAC service data unit of the second type included in the reception feedback frame; and determining a reception status of at least one second-class data block in at least one sub-frame of the MAC service data unit of the second type based on a reception feedback of the at least one second-class data block in the at least one sub-frame of the MAC service data unit of the second type included in the reception feedback frame.

Here, the MAC service data unit of the first type may be an MSDU, and the first-class data block may be a data block divided from the MSDU when the MSDU is transmitted in blocks. The first communication end sends the reception feedback frame to the second communication end based on the reception status of each block of the MSDU. The first communication end may store the block not successfully received of the MSDU in the cache for subsequent combined decoding by combining the data block retransmitted by the sending end of the data frame. The reception feedback frame carries the reception feedback of each block of the MSDU. The frame structure of the reception feedback frame may be illustrated in FIG. 10. The reception feedbacks of respective blocks may be represented by a bitmap.

After receiving the reception feedback frame sent by the first communication end, the second communication end determines the block not successfully received of the MSDU based on the reception feedback of each block of the MSDU, and retransmits the block not successfully received of the MSDU.

Here, the MAC service data unit of the second type may be an A-MSDU, and the block of the data frame may be an A-MSDU sub-frame of the A-MSDU. The first communication end sends the reception feedback frame to the second communication end based on the reception status of each A-MSDU sub-frame of the A-MSDU. The first communication end may store the A-MSDU sub-frame not successfully received in the cache for subsequent combined decoding by combining the A-MSDU sub-frame retransmitted by the sending end of the data frame. The reception feedback frame carries the reception feedback of each A-MSDU sub-frame. The frame structure of the reception feedback frame may be illustrated in FIG. 10. The reception feedbacks of respective A-MSDU sub-frames may be represented by a bitmap.

After receiving the reception feedback frame sent by the first communication end, the second communication end determines the A-MSDU sub-frame not successfully received based on the reception feedback of each A-MSDU sub-frame of the A-MSDU, and retransmits the A-MSDU sub-frame not successfully received.

An A-MSDU sub-frame may also be divided into multiple data blocks. The sending end of the data frame may send respective data blocks in sequence, to complete transmission of the A-MSDU sub-frame. The second-class data block may be a data block of the A-MSDU sub-frame. The first communication end sends the reception feedback frame to the second communication end based on the reception status of each data block of the A-MSDU sub-frame, and stores the data block not successfully received of the A-MSDU sub-frame in the cache for subsequent combined decoding by combining the data block retransmitted by the sending end of the data frame. The reception feedback frame carries the reception feedback of each data block of each A-MSDU sub-frame. The frame structure of the reception feedback frame may be illustrated in FIG. 11. The reception feedbacks of respective data blocks of respective A-MSDU sub-frames may be represented by a bitmap.

After receiving the reception feedback frame sent by the first communication end, the second communication end determines the data block of the A-MSDU sub-frame not successfully received based on the reception feedback of each data block of each A-MSDU sub-frame, and retransmits the data block of the A-MSDU sub-frame not successfully received.

In an embodiment, the first-class data block is obtained by dividing the MAC service data unit of the first type based on a first predetermined block length.

The second-class data block is obtained by dividing the sub-frame of the MAC service data unit of the second type based on a second predetermined block length.

The MAC service data unit of the first type may be the MSDU, and the MAC service data unit of the second type may be the A-MSDU.

For example, the first predetermined block length, i.e., a block threshold (also called as fragment threshold) may be set in advance, for example 300 bytes. When sending the MSDU, one MSDU may be divided into multiple blocks in the unit of 300 bytes, and sent in blocks. Each block of 300 bytes may be considered as one first-class data block.

The second predetermined block length, i.e., a block threshold (also called as fragment threshold) may be set in advance, for example 300 bytes. When sending the A-MSDU, one A-MSDU may be divided into multiple blocks in the unit of 300 bytes, and sent in blocks. Each block of 300 bytes may be considered as one second-class data block.

In an embodiment, the method further includes determining a sub-frame number of a sub-frame including the second-class data block based on a first identification included in the reception feedback frame.

As illustrated in FIG. 11, when the data frame is an A-MSDU sub-frame, the first communication end may carry the first identification in the reception feedback frame to indicate the A-MSDU sub-frame to which the reception feedback of the block of the A-MSDU sub-frame included in the reception feedback frame belongs. The first identification may be a sub-frame number of the A-MSDU sub-frame. One A-MSDU sub-frame has one unique sub-frame number in one A-MSDU. In the reception feedback frame, the first identification may be disposed in front of the corresponding reception feedback of the block of the A-MSDU sub-frame.

The second communication end may determine the A-MSDU sub-frame to which the reception feedback of the block of the A-MSDU sub-frame belongs based on the first identification included in the reception feedback frame, and retransmit the block not successfully received of the A-MSDU frame based on the reception feedback of the block of the A-MSDU sub-frame.

By carrying the sub-frame number of the A-MSDU sub-frame in the reception feedback frame, the A-MSDU sub-frame to which the reception feedback of the block of the A-MSDU sub-frame belongs may be determined accurately, thus improving accuracy of feedback.

In an embodiment, the method further includes determining a sequence number of the data frame including the block based on a second identification included in the reception feedback frame.

As illustrated in FIG. 10, when the data frame is an MSDU, the second identification may be configured to indicate a sequence number (SN) of the MSDU.

The first communication end may carry the SN of the MSDU in the reception feedback frame to indicate the MSDU to which the reception feedbacks of respective blocks of the MSDU included in the reception feedback frame belong. In one transmission, one MSDU has one unique SN. In the reception feedback frame, the SN may be disposed in front of the corresponding reception feedbacks of respective blocks of the MSDU.

The second communication end may determine the MSDU to which the reception feedbacks of respective blocks of the MSDU belong based on the SN included in the reception feedback frame, and retransmit the block not successfully received of the MSDU based on the reception feedbacks of respective blocks of the MSDU.

As illustrated in FIG. 10, when the data frame is an A-MSDU, the second identification may be configured to indicate a sequence number (SN) of the A-MSDU.

The first communication end may carry the SN of the A-MSDU in the reception feedback frame to indicate the A-MSDU to which the reception feedbacks of respective A-MSDU sub-frames of the A-MSDU included in the reception feedback frame belong. In one transmission, one A-MSDU has one unique SN. In the reception feedback frame, the SN may be disposed in front of the corresponding reception feedbacks of respective A-MSDU sub-frames of the A-MSDU.

The second communication end may determine the A-MSDU to which the reception feedbacks of respective A-MSDU sub-frames of the A-MSDU belong based on the SN included in the reception feedback frame, and retransmit the A-MSDU sub-frame not successfully received of the A-MSDU based on the reception feedbacks of respective A-MSDU sub-frames of the A-MSDU.

As illustrated in FIG. 11, when the reception feedback frame is configured to feedback the reception feedback of the A-MSDU sub-frame, the second identification may be configured to indicate the SN of the A-MSDU to which the A-MSDU sub-frame belongs.

As illustrated in FIG. 11, when the data frame is an A-MSDU sub-frame, the first communication end may carry the sub-frame number of the A-MSDU sub-frame and the SN of the A-MSDU to which the A-MSDU sub-frame belongs in the reception feedback frame, to indicate the A-MSDU sub-frame to which the reception feedback of the block of the A-MSDU sub-frame included in the reception feedback frame belongs and the A-MSDU to which the A-MSDU sub-frame belongs. One A-MSDU sub-frame has one unique sub-frame number in one A-MSDU. In one transmission, one A-MSDU has one unique SN. In the reception feedback frame, the SN of the A-MSDU and the sub-frame number of the A-MSDU may be disposed in front of the corresponding reception feedback of the block of the A-MSDU sub-frame.

The second communication end may determine the A-MSDU sub-frame to which the reception feedback of the block of the A-MSDU sub-frame belongs and the A-MSDU to which the A-MSDU sub-frame belongs based on the SN of the A-MSDU and the sub-frame number of the A-MSDU sub-frame included in the reception feedback frame, and retransmit the determined block not successfully received of the A-MSDU sub-frame in the A-MSDU based on the reception feedback of the block of the A-MSDU sub-frame.

For example, when only one data frame is transmitted between the second communication end and the first communication end, the second identification can be omitted.

By carrying the SN of the data frame in the reception feedback frame, the data frame to which the reception feedback of the block belongs can be determined accurately, thus improving accuracy of feedback.

As illustrated in FIG. 12, different TIDs may be carried in different reception feedback frames. The TID may be configured to indicate a priority of the reception feedback frame. The reception feedback frames have the same priority may carry the same TID.

In an embodiment, the method further includes determining a traffic identifier (TID) of the data frame including the block based on a third identification included in the reception feedback frame.

In an embodiment, block 201 includes in response to the reception feedback frame including reception feedbacks of a block in a predetermined number of data frames, determining a reception status of the block in each data frame based on the reception feedback of the block in each data frame included in the reception feedback frame.

The first communication end and the second communication end may negotiate the number of the data frames feedback by the reception feedback frame before sending the data frame. The feedback information of each data frame may occupy one predetermined space of the reception feedback frame. The predetermined space may be a separate field in the reception feedback frame. A length of the predetermined space may vary with a length of the reception feedback of the data frame. In the reception feedback frame, the feedback information of respective data frames is ordered based on a reception sequence of the respective data frames. The feedback information of the data frame may include reception feedbacks of respective blocks in the data frame, the SN of the data frame, the TID of the data frame and so on. When the data frame is an A-MSDU sub-frame, the feedback information of the data frame may further include the sub-frame number of the A-MSDU sub-frame.

In an embodiment, the method further includes re-sending the block not successfully received.

The second communication end only retransmits the block not successfully received after receiving the reception feedback of each block, thus reducing data amount of retransmission.

The locations and arrangements of the first identification, and/or the second identification, and/or the third identification of the data frame and/or the reception feedbacks of respective blocks of the data frame in the reception feedback frame are not limited here, which may be set according to actual requirements.

A specific embodiment is provided based on the above any embodiment.

For a case of unicast data frame, considering a compatibility with the existing standard, the unicast data frame may be divided into multiple blocks (fragments) when transmitting the unicast data frame. The feedback made by the first communication end to the received unicast data frame is subdivided into blocks, a specific format is illustrated in FIG. 10. SN is a sequence number of the sent MSDU, bitmap is configured to indicate a reception status of respective blocks in each MSDU.

Considering that an HARQ feedback mechanism may be used in the IEEE802.11be, one data frame has an SN subfield and a bitmap subfield. The number of SN subfields and bitmap fields is based on the number of unicast data frames for which the sending end and the receiving end negotiate to feedback the ACK frame. As illustrated in FIG. 10, the SN subfields and the bitmap subfield may be repeated, indicating that reception feedbacks of blocks of multiple data frames.

In FIG. 10, SN is the sequence number of the sent MSDU, and bitmap is configured to indicate the reception status of respective blocks of each MSDU. SN may indicate the sequence number of the sent A-MSDU, and bitmap may be configured to indicate the reception status of A-MSDY sub-frames of each A-MSDU. A format of the MSDU is illustrated in FIG. 10. When the status of each data frame is feedback, the SN filed may be omitted.

If each A-MSDU sub-frame is transmitted in blocks, a format of the reception feedback frame of the A-MSDU sub-frame is illustrated in FIG. 11.

The SN subfield, the A-MSDU order subfield, and the bitmap subfield may occur for many times, indicating that multiple A-MSDU sub-frames are transmitted in blocks. A-MSDU order is configured to indicate the sub-frame number of the A-MSDU. Bitmap is configured to indicate the reception status of respective blocks of the A-MSDU sub-frame. If feedback is made to one A-MSDU, the SN subfield may be omitted.

With regard to the feedback including different TIDs for the same device, the format is illustrated in FIG. 12.

The TID subfield, the SN subfield, the A-MSDU order subfield, and the bitmap subfield may be repeated, indicating the reception feedbacks of blocks in multiple data frames. The number of repetitions is based on the number of data frames feedback by the reception feedback frame negotiated by the first communication end and the second communication end.

Figure 14:
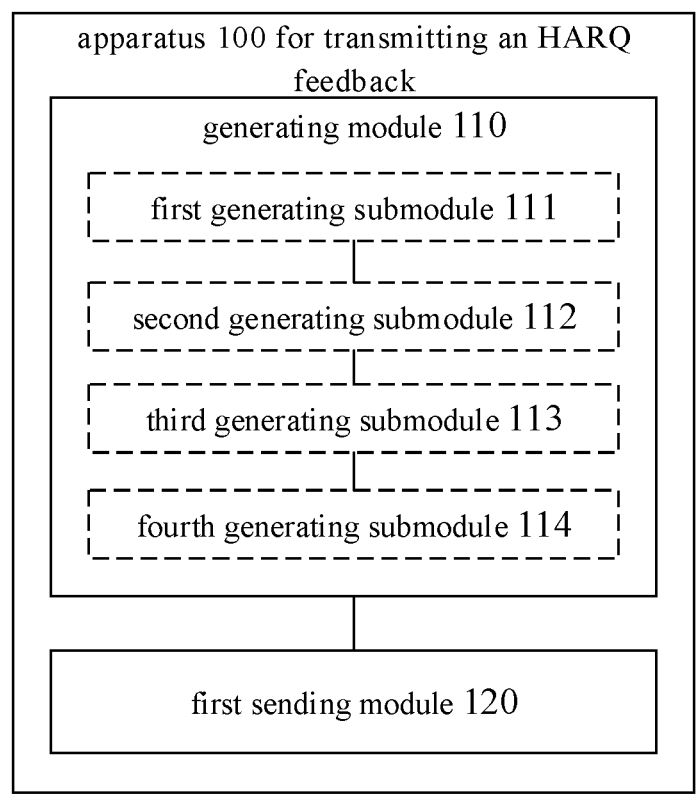
FIG. 14 is a block diagram illustrating an apparatus for transmitting a HARQ feedback according to an embodiment.

Embodiments of the disclosure further provide an apparatus for transmitting an HARQ feedback, applied in a first communication end in a wireless communication, as illustrated in FIG. 14. The apparatus 100 includes a generating module 110 and a first sending module 120.

The generating module 110 is configured to generate a reception feedback frame including a reception feedback of a block in a data frame based on a reception status of the block of the data frame transmitted in blocks.

The first sending module 120 is configured to send the reception feedback frame.

In an embodiment, the generating module 110 includes at least one of the following: a first generating submodule 111, configured to, in response to the data frame being a media access control (MAC) service data unit of a first type, generate the reception feedback frame including a reception feedback of a first-class data block based on a reception status of at least one first-class data block of the MAC service data unit of the first type; a second generating submodule 112, configured to, in response to the data frame being a MAC service data unit of a second type, generate the reception feedback frame including a reception feedback of a sub-frame based on a reception status of at least one sub-frame of the MAC service data unit of the second type; and a third generating submodule 113, configured to, in response to the data frame being the MAC service data unit of the second type, generate the reception feedback frame including a reception feedback of a second-class data block based on a reception status of at least one second-class data block in at least one sub-frame of the MAC service data unit of the second type.

In an embodiment, the first-class data block is obtained by dividing the MAC service data unit of the first type based on a first predetermined block length; and the second-class data block is obtained by dividing the sub-frame of the MAC service data unit of the second type based on a second predetermined block length.

In an embodiment, the reception feedback frame including the reception feedback of the second-class data block further includes a first identification. The first identification is configured to indicate a sub-frame number of a sub-frame including the second-class data block.

In an embodiment, the reception feedback frame further includes a second identification. The second identification is configured to indicate a sequence number of the data frame.

In an embodiment, the reception feedback frame further includes a third identification. The third identification is configured to indicate a traffic identifier (TID) of the data frame.

In an embodiment, the generating module includes a fourth generating submodule 114, configured to, in response to the reception feedback frame being configured to feedback reception feedbacks of a block in a predetermined number of data frames, generate the reception feedback frame including the reception feedback of the block in each data frame.

Figure 15:
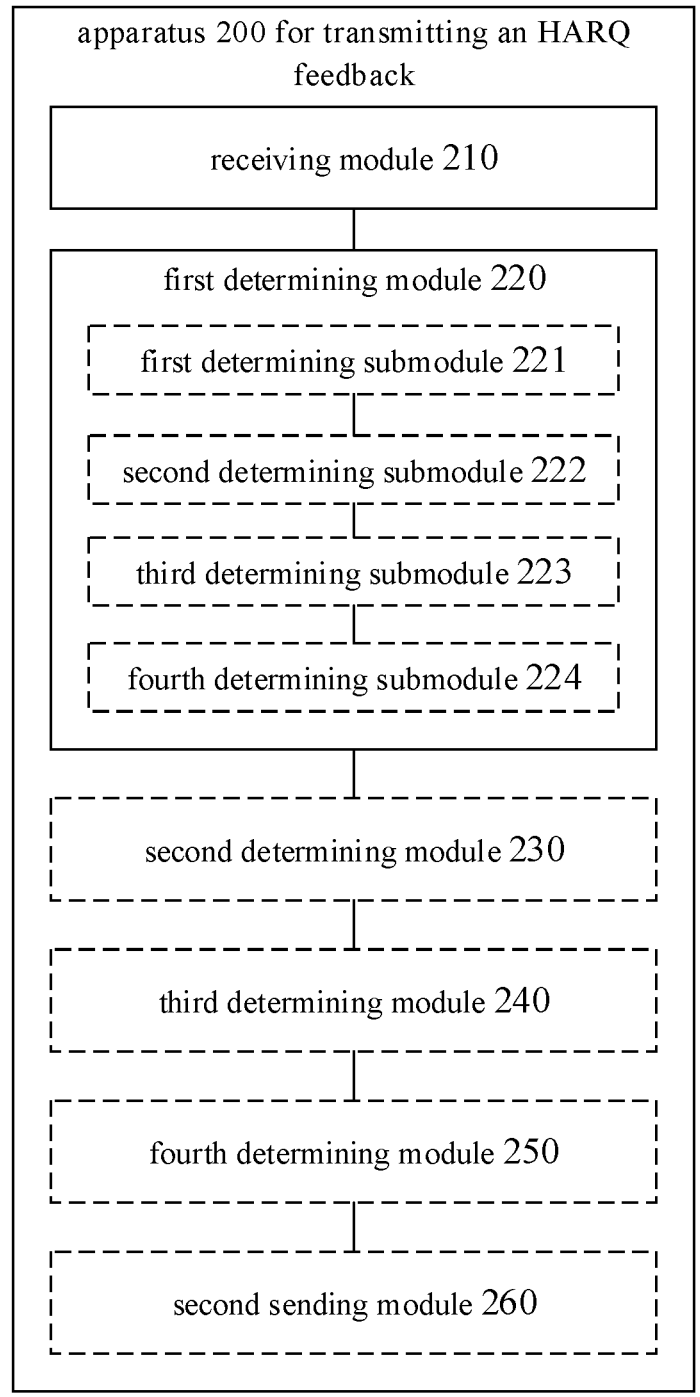
FIG. 15 is a block diagram illustrating an apparatus for transmitting a HARQ feedback according to another embodiment.

Embodiments of the disclosure further provide an apparatus for transmitting an HARQ feedback, applied in a second communication end in a wireless communication, as illustrated in FIG. 15. The apparatus 200 includes a receiving module 210 and a first determining module 220.

The receiving module 210 is configured to receive a reception feedback frame sent by a first communication end.

The first determining module 220 is configured to determine a reception status of a block based on a reception feedback of the block in a data frame included in the reception feedback frame, in which the data frame is transmitted in blocks.

In an embodiment, the first determining module 220 includes at least one of the following: a first determining submodule 221, configured to, determine a reception status of at least one first-class data block of a media access control (MAC) service data unit of a first type based on a reception feedback of the at least one first-class data block of the MAC service data unit of the first type included in the reception feedback frame; a second determining submodule 222, configured to, determine a reception status of at least one sub-frame of a MAC service data unit of a second type based on a reception feedback of the at least one sub-frame of the MAC service data unit of the second type included in the reception feedback frame; and a third determining submodule 223, configured to, determine a reception status of at least one second-class data block in at least one sub-frame of the MAC service data unit of the second type based on a reception feedback of the at least one second-class data block in the at least one sub-frame of the MAC service data unit of the second type included in the reception feedback frame.

In an embodiment, the first-class data block is obtained by dividing the MAC service data unit of the first type based on a first predetermined block length; and the second-class data block is obtained by dividing the sub-frame of the MAC service data unit of the second type based on a second predetermined block length.

In an embodiment, the apparatus 200 further includes a second determining module 230, configured to determine a sub-frame number of a sub-frame including the second-class data block based on a first identification included in the reception feedback frame.

In an embodiment, the apparatus further includes a third determining module 240, configured to determine a sequence number of the data frame including the block based on a second identification included in the reception feedback frame.

In an embodiment, the apparatus further includes a fourth determining module 250, configured to determine a traffic identifier (TID) of the data frame including the block based on a third identification included in the reception feedback frame.

In an embodiment, the first determining module 210 includes a fourth determining submodule 224, configured to, in response to the reception feedback frame including reception feedbacks of a block in a predetermined number of data frames, determine a reception status of the block in each data frame based on the reception feedback of the block in each data frame included in the reception feedback frame.

In an embodiment, the apparatus 200 further includes a second sending module 260, configured to re-send the block not successfully received.

In an example embodiment, the generating module 110, the first sending module 120, the receiving module 210, the first determining module 220, the second determining module 230, the third determining module 240, the fourth determining module 250 and the second sending module 260 may be implemented by one or more central processing units (CPUs), graphics processing units (GPUs), baseband processors (BPs), application specific integrated circuits (ASICs), DSPs, programmable logic devices (PLDs), complex programmable logic devices (CPLDs), field-programmable gate arrays (FPGA), general processors, controllers, micro controller units (MCUs), microprocessors or other electronic components for perform the above-mentioned method.

Figure 16:
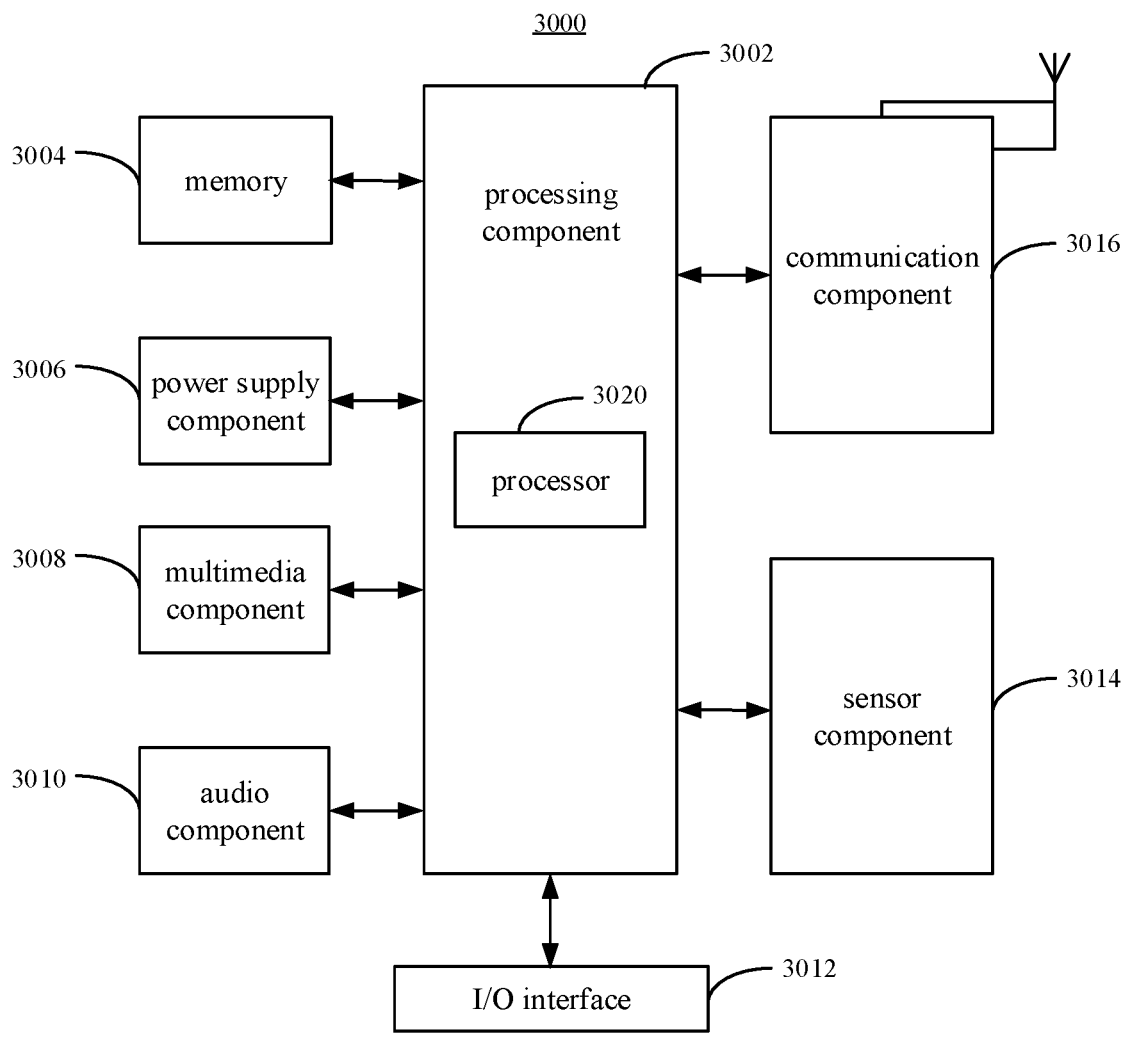
FIG. 16 is a block diagram illustrating a device configured to transmit a HARQ feedback according to an embodiment.

FIG. 16 is a block diagram illustrating a device 3000 configured to transmit a HARQ feedback according to an embodiment. For example, the device 3000 may be a mobile phone, a computer, a digital broadcast terminal, a messaging device, a gaming console, a tablet, a medical device, exercise equipment, a personal digital assistant, and the like.

Referring to FIG. 16, the device 3000 may include one or more of the following components: a processing component 3002, a memory 3004, a power component 3006, a multimedia component 3008, an audio component 3010, an input/output (I/O) interface 3012, a sensor component 3014 and a communication component 3016.

The processing component 3002 typically controls overall operations of the device 3000, such as the operations associated with display, telephone calls, data communications, camera operations, and recording operations. The processing component 3002 may include one or more processors 3020 to execute instructions so as to perform all or a part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, videos, etc. The memory 3004 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 is configured to provide power to various components of the device 3000. The power component 3006 may include a power management system, one or more power sources, and other components associated with the generation, control, and distribution of power in the device 3000.

The multimedia component 3008 includes a screen configured to provide an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 3008 includes a front camera and/or a rear camera. The front camera and the rear camera may receive an external multimedia datum when the device 3000 is in an operation mode such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone ("MIC") configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a loud speaker to output audio signals.

The I/O interface 3012 is configured to provide an interface between the processing component 3002 and peripheral interface modules, such as a keyboard, a click wheel, buttons, and the like. The buttons may include, but are not limited to, a home button, a volume button, a starting button, and a locking button.

The sensor component 3014 includes one or more sensors to provide status assessments of various aspects of the device 3000. For instance, the sensor component 3014 may detect an on/off status of the device 3000, relative positioning of components (e.g., a display screen and a keypad) of the device 3000. The sensor component 3014 may further detect a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may further include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate a wired or wireless communication between the device 3000 and other terminals. The device 3000 can access a wireless network based on a communication standard, such as Wi-Fi, 2G, or 3G, or a combination thereof. In one example embodiment, the communication component 3016 receives a broadcast signal or broadcast associated information from an external broadcast control system via a broadcast channel. In one example embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, or other technologies.

In example embodiments, the device 3000 may be implemented with one or more electronic elements such as application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In example embodiments, there is further provided a non-transitory computer readable storage medium including instructions, such as the memory 3004 including instructions executable by the processor 3020 in the device 3000 to perform the above-described methods. For example, the non-transitory computer-readable storage medium may be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings and that various modifications and changes can be made without departing from the scope thereof. It is intended that the scope of the invention only be limited by the appended claims.

What is claimed is:

1. A method for transmitting a hybrid automatic repeat request (HARQ) feedback, performed by a first communication end, comprising:
generating a reception feedback frame comprising a reception feedback of a block in a data frame based on a reception status of the block of the data frame transmitted in blocks; and
sending the reception feedback frame;
said generating a reception feedback frame comprising a reception feedback of a block in a data frame based on a reception status of the block of the data frame transmitted in blocks comprising:
generating the reception feedback frame comprising a reception feedback of at least one first-class data block of a media access control service data unit (MSDU) based on a reception status of the at least one first-class data block, wherein the data frame is the MSDU divided into multiple first-class data blocks;
generating the reception feedback frame comprising a reception feedback of at least one second-class data block in at least one aggregation media access control service data unit (A-MSDU) sub-frame of an A-MSDU based on a reception status of the at least one second-class data block, wherein the data frame is the A-MSDU comprising a plurality of A-MSDU sub-frames each divided into multiple second-class data blocks.

2. The method of claim 1, said generating a reception feedback frame comprising a reception feedback of a block in a data frame based on a reception status of the block of the data frame transmitted in blocks comprising:
generating the reception feedback frame comprising a reception feedback of at least one A-MSDU of the A-MSDU sub-frame based on a reception status of the at least one A-MSDU sub-frame, wherein the data frame is the A-MSDU comprising a plurality of A-MSDU sub-frames.

3. The method of claim 1, wherein,
the first-class data block is obtained by dividing the MAC service data unit of the first type based on a first predetermined block length; and
the second-class data block is obtained by dividing the sub-frame of the MAC service data unit of the second type based on a second predetermined block length.

4. The method of claim 1, wherein,
the reception feedback frame comprising the reception feedback of the second-class data block further comprises a first identification;
wherein the first identification is configured to indicate a sub-frame number of a sub-frame comprising the second-class data block.

5. The method of claim 1, wherein,
the reception feedback frame further comprises a second identification;
wherein the second identification is configured to indicate a sequence number of the data frame.

6. The method of claim 1, wherein,
the reception feedback frame further comprises a third identification;
wherein the third identification is configured to indicate a traffic identifier (TID) of the data frame.

7. The method of claim 1, said generating a reception feedback frame comprising a reception feedback of a block in a data frame comprising:
generating the reception feedback frame comprising a reception feedback of a block in each data frame, wherein the reception feedback frame is configured to feedback reception feedbacks of blocks in a predetermined number of data frames.

8. A method for transmitting a hybrid automatic repeat request (HARQ) feedback, performed by a second communication end, comprising:
receiving a reception feedback frame sent by a first communication end; and
determining a reception status of a block based on a reception feedback of the block in a data frame comprised in the reception feedback frame, wherein the data frame is transmitted in blocks;
said determining a reception status of a block based on a reception feedback of the block in a data frame comprised in the reception feedback frame comprising:
determining a reception status of at least one first-class data block of a media access control service data unit (MSDU) divided into multiple first-class data blocks based on a reception feedback of the at least one first-class data block comprised in the reception feedback frame;
determining a reception status of at least one second-class data block in at least one A-MSDU sub-frame of an aggregation media access control service data unit (A-MSDU) comprising a plurality of A-MSDU sub-frames each divided into multiple second-class data blocks based on a reception feedback of the at least one second-class data block comprised in the reception feedback frame.

9. The method of claim 8, said determining a reception status of a block based on a reception feedback of the block in a data frame comprised in the reception feedback frame comprising
determining a reception status of at least one A-MSDU sub-frame of the A-MSDU comprising a plurality of A-MSDU sub-frames based on a reception feedback of the at least one A-MSDU sub-frame comprised in the reception feedback frame.

10. The method claim 8, wherein,
the first-class data block is obtained by dividing the MAC service data unit of the first type based on a first predetermined block length; and
the second-class data block is obtained by dividing the sub-frame of the MAC service data unit of the second type based on a second predetermined block length.

11. The method of claim 8, further comprising:
determining a sub-frame number of a sub-frame comprising the second-class data block based on a first identification comprised in the reception feedback frame.

12. The method of claim 8, further comprising:
determining a sequence number of the data frame comprising the block based on a second identification comprised in the reception feedback frame.

13. The method of claim 8, further comprising:
determining a traffic identifier (TID) of the data frame comprising the block based on a third identification comprised in the reception feedback frame.

14. The method of claim 8, said determining a reception status of a block based on a reception feedback of the block in a data frame comprised in the reception feedback frame comprising:

determining a reception status of the block in each data frame based on a reception feedback of a block in each data frame comprised in the reception feedback frame, wherein the reception feedback frame comprises reception feedbacks of blocks in a predetermined number of data frames.

15. The method of claim 8, further comprising:
re-sending the block not successfully received.

16. A communication device, comprising: a processor, a memory storing an executable program executed by the processor; wherein when the processor executes the executable program, the processor performs steps of a method for transmitting a hybrid automatic repeat request (HARQ) feedback, comprising:
  generating a reception feedback frame comprising a reception feedback of a block in a data frame based on a reception status of the block of the data frame transmitted in blocks; and
  sending the reception feedback frame;
  said generating a reception feedback frame comprising a reception feedback of a block in a data frame based on a reception status of the block of the data frame transmitted in blocks comprising:
  generating the reception feedback frame comprising a reception feedback of at least one first-class data block of a media access control service data unit (MSDU) based on a reception status of the at least one first-class data block, wherein the data frame is the MSDU divided into multiple first-class data blocks;
  generating the reception feedback frame comprising a reception feedback of at least one second-class data block in at least one aggregation media access control service data unit (A-MSDU) sub-frame of an A-MSDU based on a reception status of the at least one second-class data block, wherein the data frame is the A-MSDU comprising a plurality of A-MSDU sub-frames each divided into multiple second-class data blocks.

17. The device of claim 16, said generating a reception feedback frame comprising a reception feedback of a block in a data frame based on a reception status of the block of the data frame transmitted in blocks comprising at least one of the following:
  generating the reception feedback frame comprising a reception feedback of at least one A-MSDU of the A-MSDU a sub-frame based on a reception status of the at least one A-MSDU sub-frame, wherein the data frame is the A-MSDU comprising a plurality of A-MSDU sub-frames.

18. The device of claim 16, wherein,
the first-class data block is obtained by dividing the MAC service data unit of the first type based on a first predetermined block length; and
the second-class data block is obtained by dividing the sub-frame of the MAC service data unit of the second type based on a second predetermined block length.

19. The device of claim 16, wherein,
the reception feedback frame comprising the reception feedback of the second-class data block further comprises a first identification;
wherein the first identification is configured to indicate a sub-frame number of a sub-frame comprising the second-class data block.

20. A communication device, comprising: a processor, a memory storing an executable program executed by the processor; wherein when the processor executes the executable program, the processor performs steps of the method for transmitting a hybrid automatic repeat request (HARQ) feedback according to claim 8.

* * * * *